March 26, 1929.  C. E. STARR  1,706,551
TRANSMISSION MECHANISM
Filed May 8, 1922   2 Sheets-Sheet 1
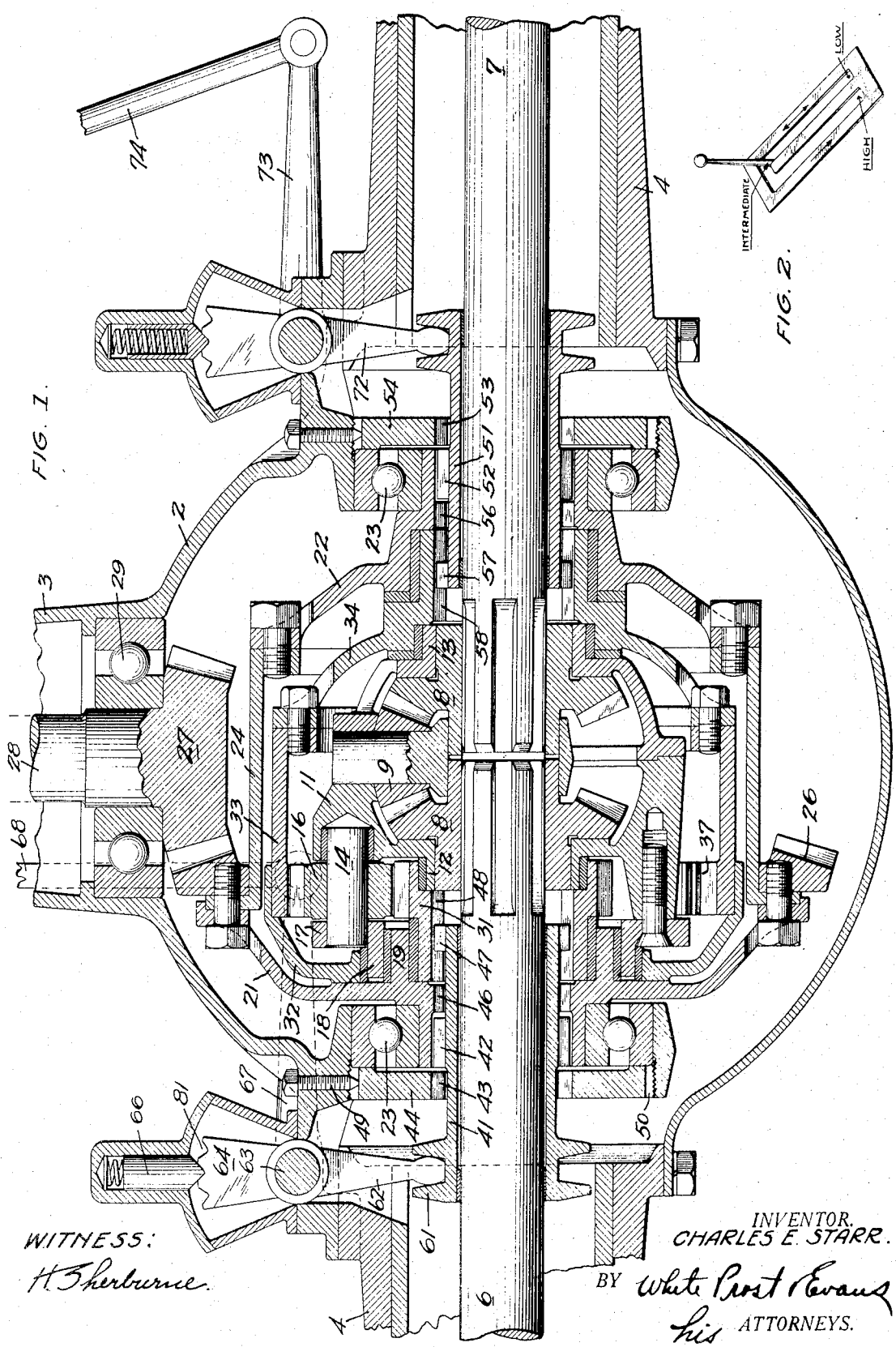
WITNESS:
H. Sherburne
INVENTOR.
CHARLES E. STARR.
BY White Prost Evans
his ATTORNEYS.

March 26, 1929.  C. E. STARR  1,706,551
TRANSMISSION MECHANISM
Filed May 8, 1922  2 Sheets-Sheet 2
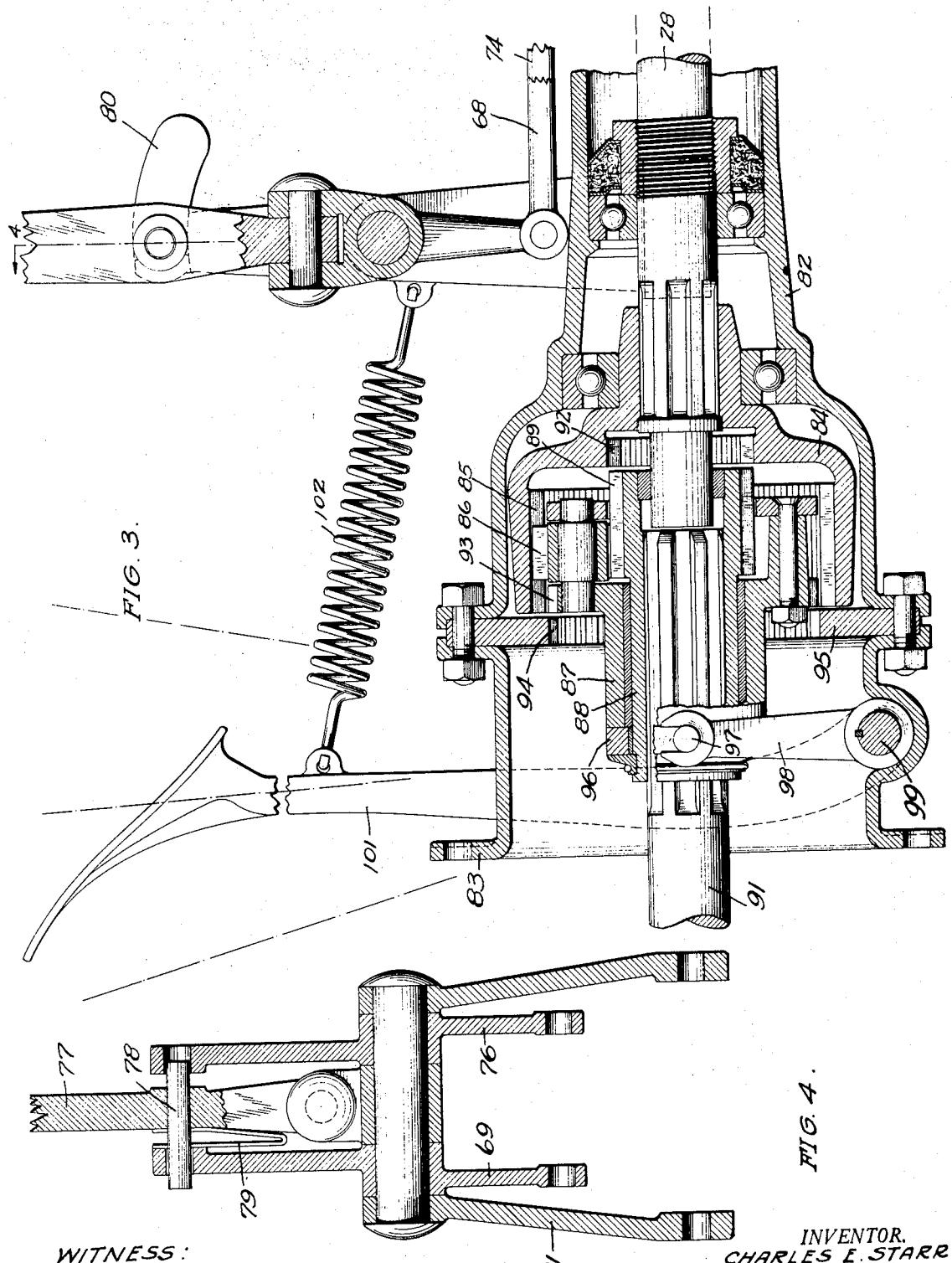
WITNESS:
H. Sherburne
INVENTOR.
CHARLES E. STARR
BY White Prost & Evans
his ATTORNEYS.

Patented Mar. 26, 1929.

1,706,551

UNITED STATES PATENT OFFICE.

CHARLES E. STARR, OF OAKLAND, CALIFORNIA, ASSIGNOR TO PERFECTO GEAR DIFFERENTIAL CO., OF SEATTLE, WASHINGTON, A CORPORATION OF WASHINGTON.

TRANSMISSION MECHANISM.

Application filed May 8, 1922. Serial No. 559,182.

My invention relates to transmission mechanisms for motor driven vehicles and particularly to such mechanism in combination with a differential system.

One of the objects of the invention is the provision of a combined differential and speed change mechanism. Another object of the invention is the provision of a compact mechanism in the axle housing functioning as a differential and as a speed change mechanism providing three different speeds. Another object of the invention is the provision of a mechanism of the character described embodying improved means for journaling the rotating elements.

My invention possesses many other objects and features of advantage, some of which, with the foregoing will be set forth in the following description of my invention. It is to be understood that I do not limit myself to the showing made by the said description, as I may adopt variant forms of my invention within the scope of the claims.

Referring to the drawings; Fig. 1 is a horizontal sectional view thru my transmission mechanism. The enclosing housing is the rear axle housing, and the central shafts are the rear axles of a motor vehicle embodying my invention. Fig. 2 is a diagram illustrating the path of motion of the gear shift lever for operating my device. Fig. 3 is a vertical sectional view of the operating and reversing mechanism forming part of my invention. Fig. 4 is a vertical sectional view thru a portion of the operating mechanism, the plane of section being indicated by the line 4—4 of Fig. 3.

Broadly considered my invention comprises a differential gear system interposed between the rear axle parts, and a planetary gear system interposed between the differential casing and a rotor to which power is applied from the driving shaft, the intermediate or planetary gears of the planetary system being journaled on the differential casing. Clutch means selectively operated are provided for locking the various elements together in the following combinations:

To secure low speed, the rotor is locked to the inner gear of the planetary system, and the ring gear of the planetary system is locked to the fixed housing inclosing the rest of the mechanism.

For second, or intermediate speed, the inner gear of the planetary system is locked to the fixed housing and the rotor is locked to the ring gear of the planetary system.

For high speed, the inner gear and ring gears of the planetary system are both locked to the rotor, which causes all of the mechanism including the differential casing to revolve as one unit at the speed of the rotor. Means are also provided for suitably journaling the several rotating elements to secure stability, strength, and quiet operation. Selective means is also provided for reversing the direction of rotation of the rotor.

More particularly, the transmission of my invention comprises a housing 2, preferably of substantially globular form and provided with an extension 3 forming part of the torque tube, and extensions 4 forming the housing for the rear or driving axles 6 and 7 which extend outwardly to the driving wheels. Mounted on the adjacent ends of the alined shafts 6 and 7 are differential gears 8 connected by differential pinions of which one 9, is shown in Fig. 1, mounted in the differential casing 11, having flanges 12 and 13 journaled on the hubs of the differential gears 8.

Extending laterally from the side of the differential casing are studs 14, preferably three in number, on each of which is journaled a pinion 16. These pinions constitute the intermediate or planetary gears of the planetary system. To provide an outer bearing for the studs 14, a ring 17, in which the outer ends of the studs are seated is arranged with a bearing flange 18 having its bearing on the flange 19 forming part of the rotor which comprises the end or disk elements 21 and 22 journaled in the fixed housing 2 on the ball bearings 23, and connected by the cylindrical element 24. On the rotor is secured the ring gear 26 in mesh with the driving pinion 27, turned by the drive shaft 28, suitably journaled in bearings 29 in the fixed housing.

Having an outside bearing on the rotor flange 19 and an inside bearing on the differential casing flange 12, is a sleeve or collar 31 provided with teeth meshing with the intermediate gears 16 and comprising the inner gear of the planetary system.

Arranged between the differential casing and the rotor casing is a ring gear casing somewhat similar in form to the rotor casing and comprising the end or disk member 32 having a bearing on the outside of the differential casing flange 18 and connected by a cylindrical member 33 with the disk or end member 34 having an inside bearing on the differential casing flange 13, and an outside bearing in the member 22 of the rotor casing. Teeth 37 are formed on the inside of the cylindrical member 33 and comprise the ring gear of the planetary system. The ring gear and rotor casings may be of closed or cage type, but suitable apertures are of course provided in these casings and in the differential casing for the free distribution of lubricant to the bearings. I prefer to separate these casings where they bear upon each other by suitable bushings of flat ring or sleeve type as shown in Fig. 1.

From the above it will be clear that I provide a differential system in combination with a planetary system, the intermediate gears 16 of the planetary system being journaled on the differential casing 11, the ring gear 37 and the inner gear 31 completing the planetary system. It will now be apparent that by locking the rotor and ring gear casings together and holding the inner gear 31 stationary, rotation of the rotor by the pinion 27 will effect the rotation of the differential casing and axles 6 and 7 in accordance with the ratios of the meshing gears. Such a combination will give second, or intermediate speed. If, on the other hand, the ring gear casing is held stationary and the rotor and inner gear 31 locked for rotation together the differential housing will be rotated at a considerably lower speed which is the low speed of my transmission mechanism. It will also be apparent that if the rotor and ring gear casings are locked together and also the rotor and inner gears that the intermediate gear 16 cannot turn, and rotor, ring gear casing, inner gear and differential casing will all turn together as one unit, which is the high speed combination of my mechanism.

Means are provided for locking these various parts together to effect the combinations stated. Journaled loosely on the shaft 6 is a sleeve 41 provided with teeth 42 adapted to be engaged with teeth 43, formed on the fixed plate 44 which is secured in the housing 2, or with teeth 46 formed on the rotor casing members 21. The sleeve 41 is also provided with teeth 47 permanently slidably engaged with complementary teeth 48 on the inside of the inner gear 31, so that the inner gear and the sleeve are fixed for rotation together, but the sleeve is capable of axial movement in respect of the inner gear. The plate 44 is preferably threaded into its seat formed in the main housing and is prevented from turning by a cap screw 49 seating in one of the V-grooves 50 closely spaced about the periphery of the plate.

On the opposite side of the mechanism a similar sleeve is provided in respect to the rotor and ring gear casing, the sleeve 51 being provided with teeth 52 adapted to engage teeth 53 in the fixed plate 54, or teeth 56 in the member 22 of the rotor casing. The sleeve 51 is also provided with teeth 57 interlocking with teeth 58 on the ring gear casing so that while the sleeve 51 is slidable axially in respect of the ring gear casing the two are locked for rotation together.

It will be observed that if the sleeve 41 is moved to the right (of Fig. 1) to engage the clutch members 42—46, the rotor is locked for rotation with the inner gear; and if the sleeve 41 is moved to the left to engage the clutch members 42—43 the inner gear will be locked to the fixed housing and thus held stationary. Similarly if the sleeve 51 is moved to the right to engage the clutch members 52—53, the ring gear casing will be locked with the fixed housing and held stationary, whereas if the sleeve 51 is moved to the left to engage the clutch members 52—56, the ring gear casing and rotor will be locked together. It will also be noted that if the two sleeves are moved toward each other, that is, to lock the rotor with the inner gear, and on the opposite side, the rotor with the ring gear, all of the parts will then be locked together for rotation as one unit.

Selective means are provided for effecting the movement of the sleeves to the right or to the left, or toward each other to secure the results set forth. The sleeve 41 is provided with spaced annular flanges 61 adapted to be engaged by the ball pointed end of the lever 62 mounted on the pivot pin 63 fixed in the housing 2 and having an oppositely extending arm 64 provided with notches engaged by the spring-pressed pin 66 to resiliently hold the lever in adjusted position. On the outside of the housing an arm 67 extends at substantially right angles to the arm 62 and is connected by a suitable link 68 with a lever 69 pivotally mounted on the bracket 71 fixed to any convenient portion of the torque tube or extension of the engine casing. The sleeve 51 is similarly controlled by the lever 72 provided with the arm 73 on the outside of the casing connected by link 74 with a lever 76 similar to lever 69 and mounted therewith on the same bracket 71.

Between the oppositely extending arms of the levers 69 and 76 is pivotally arranged for movement in two directions a control lever 77 in which is fixed a pin 78 normally engaging in apertures formed in the lever arms 69 and 76, so that movement of the control lever 77 away from and toward the driver or operator, is accompanied by corresponding movement of the two lever arms 69 and 76. A spring 79 normally retains the pin 78 in engagement with the levers 69 and 76. Movement, however, of the control lever 77 to the left, disengages the pin 78 from the lever 76 and lever 69 may then be moved alone. In order to prevent engagement of the pin 78 behind the edge of the lever 76, the latter is provided with a wing 80 best shown in Fig. 3, so that operative engagement of the pin 78 with the lever 76 is possible in but the one relationship of parts, that is, with the two levers 76 and 69 in substantial parallelism.

From the above and by reference to Fig. 3, it will be clear that if the control lever 77 is pulled toward the operator, the pin 78 being in engagement with both levers 69 and 76, the two sleeves will be moved to the right of Fig. 1, and a combination of gears effected as previously explained giving low speed. If the operating lever 77 with the pin in engagement with both levers 69 and 76 is moved away from the operator both sleeves will be moved to the left of Fig. 1 and a combination of gears giving intermediate speed will result. If the control lever 77 with the pin in engagement with both levers 69 and 76 is moved away from the operator and then moved to the left, leaving the lever 76 in its adjusted position, and then pulled toward the operator the sleeves will have been moved toward each other, and the rotor locked to both inner and ring gears so that all of the parts revolve as one in high speed. To return to intermediate speed it is merely necessary to push the control lever 77 away from the operator to permit the pin 78 to reengage in the lever 76. Low gear is again achieved by drawing the lever straight backwardly toward the operator. It is desirable to disengage the clutch before such speed changes are effected, but this is unnecessary with the practiced driver. In Fig. 1, the sleeve 41 is shown held in a neutral position by the engagement of the spring-pressed pin 66 in the middle one of three notches 81. Personally I prefer to so indicate the neutral position of the clutch sleeves, but I may omit the neutral notch so that the spring-pressed pins function only to retain the clutch members in their respective engaged positions.

Means are provided for reversing the direction of motion of the driving shaft 28, which is journaled at the front end, as shown in Fig. 3, in a fixed housing 82, the opposite end 83 of which, is flanged for attachment to the engine housing. Splined on the end of the shaft 28 is a cup 84 provided with internal teeth 85 comprising the outer gear of a train of gears of which the middle gears 86 are journaled on the sleeve 87, which is journaled on the inner sleeve 88, on the end of which are teeth 89 comprising the inner gears of the train. Although the sleeves 87 and 88 are relatively rotatable, both sleeves are fixed for axial movement upon the shaft 91 which extends forwardly to the clutch and is driven thru the clutch by the engine. The cup 84 is formed with teeth 92 in which the teeth 89 are adapted to be engaged, and when so engaged it will be seen that shaft 91 is locked for rotation with shaft 28, that is, there is a direct connection between the two, teeth 89 and 92 acting as clutch members. The sleeve 87 is also provided with teeth 93 which are adapted to be engaged with complementary teeth 94 formed in the fixed plate 95, forming part of the housing 82. When so engaged the sleeve 87 is held stationary and rotation of the shaft 91 is communicated thru the gears 86 to the outer gear 85 in the opposite direction and at greatly reduced velocity.

Means are provided for shifting the sleeves 87 and 88 to selectively engage the clutch members to secure either connection desired. A collar 96 rotatably connected with the sleeves 87 and 88 is provided with pins 97, engaged by the arms of a yoke 98 fixed on the shaft 99 and operated by a foot pedal 101, connected by spring 102 to a fixed portion of the frame, so that under normal conditions the clutch teeth 89 and 92 are engaged to connect the shaft 91 directly to the shaft 28. Forward pressure on the pedal 101 against the tension of the spring 102 disengages the clutch members 89—92 and engages the clutch members 93—94 to effect the reversal of motion of shaft 28. It follows, of course, from the above that there are thus provided three forward speeds and three reverse speeds according to the position of pedal 101 and the control lever 77.

I claim:

1. The combination with a differential gear system, of a planetary gear system including a ring gear and an inner gear and having planetary pinions journaled on the differential casing, a rotor, a fixed element, and means for locking said fixed element to the inner gear, said rotor to the ring gear, said rotor to said inner gear, and said ring gear to said fixed element.

2. The combination with a differential gear system, of a planetary gear system including a ring gear and an inner gear and having planetary pinions journaled on the differential casing, a rotor, a fixed element, and selective means for coincidentally locking said rotor to said inner gear and said fixed element to said ring gear, or coincidentally locking said rotor to said ring gear and said inner gear to said fixed element, or coincidentally locking said inner gear and said ring gear to said rotor.

3. The combination with a differential gear system, of a planetary gear system including an inner gear and having planetary pinions journaled on the differential casing, a rotor, a fixed element, and means rotatable with said inner gear and optionally engageable directly with said fixed element or with said rotor for locking said inner gear to said fixed element or to said rotor.

4. The combination with a differential gear system, of a planetary gear system including a ring gear and an inner gear and having planetary pinions journaled on the differential casing, a rotor, a fixed element, and means locked for rotation with said inner gear for optionally locking said ring gear to said fixed element or to said rotor.

5. The combination with a differential gear system, of a planetary gear system including a ring gear and an inner gear and having planetary pinions journaled on the differential casing, a rotor, a fixed element, and selective means for locking said rotor to said inner gear and said fixed element to said ring gear, or locking said rotor to said ring gear and said inner gear to said fixed element.

6. The combination with a differential gear system, of a planetary gear system including a ring gear and an inner gear and having planetary pinions journaled on the differential casing, a rotor, a fixed element, and selective means for locking said rotor to said inner gear and said fixed element to said ring gear, or locking said inner gear and said ring gear to said rotor.

7. The combination with a differential gear system, of a planetary gear system including a ring gear and an inner gear and having planetary pinions journaled on the differential casing, a rotor, a fixed element, and selective means for locking said rotor to said ring gear and said inner gear to said fixed element, or locking said inner gear and said ring gear to said rotor.

8. The combination with a differential gear system, of a planetary gear system including a ring gear and an inner gear and having planetary pinions journaled on the differential casing, a rotor, a fixed element, and means for coincidentally locking said rotor to said inner gear and said fixed element to said ring gear.

9. The combination with a differential gear system, of a planetary gear system including a ring gear and an inner gear and having planetary pinions journaled on the differential casing, a rotor, a fixed element, and means for coincidentally locking said rotor to said ring gear and said inner gear to said fixed element.

10. The combination with a differential gear system, of a planetary gear system including a ring gear and an inner gear and having planetary pinions journaled on the differential casing, a rotor, and means movable axially in respect to said rotor for coincidentally locking said rotor to said ring gear and said inner gear.

11. The combination with a differential gear system of a planetary gear system including a ring gear and an inner gear and having planetary pinions journaled on the differential casing, a rotor, means for driving said rotor, a fixed element, and selectively controlled clutches for coincidentally locking said rotor to said inner gear and said ring gear to said fixed element, or said inner gear to said fixed element and said rotor to said ring gear, or said inner gear and said ring gear to said rotor.

12. The combination with a differential gear system of a planetary gear system including a ring gear and an inner gear and having planetary pinions journaled on the differential casing, a rotor, means for driving said rotor, a fixed element, a pair of axially movable sleeves, and selectively engageable clutch members carried by said sleeves, and by said rotor and fixed element and said inner and ring gears for coincidentally locking said rotor to said inner gear and said ring gear to said fixed element, or said inner gear to said fixed element and said rotor to said ring gear, or said inner and ring gears to said rotor.

13. The combination with a differential gear system of a planetary gear system including a ring gear and an inner gear and having planetary pinions journaled on the differential casing, a rotor, means for driving said rotor, a fixed element and clutch members for coincidentally locking said rotor to said inner gear and said fixed element to said ring gear.

14. The combination with a differential gear system of a planetary gear system including a ring gear and an inner gear and having planetary pinions journaled on the differential casing, a rotor, means for driving said rotor, a fixed element and clutch members for coincidentally locking said rotor to said ring gear and said inner gear to said fixed element.

15. The combination with a differential gear system of a planetary gear system including a ring gear and an inner gear and having planetary pinions journaled on the differential casing, a rotor, means for driving said rotor, and clutch members axially movable in respect to said rotor for coincidentally locking said rotor to said ring and inner gears.

16. In a device of the character described, a fixed housing, axles journaled in said housing, a differential system including a casing interposed between said axles, a rotor, means for driving said rotor, an axially movable sleeve, clutch members on said housing and on said rotor, complementary clutch members on said sleeve, an inner gear fixed for rotation with said sleeve, a second axially movable sleeve, a second set of clutch members on said housing and on said rotor, complementary clutch members on said second sleeve, a ring gear fixed for rotation with said second sleeve, intermediate gears journaled on said differential casing and in mesh with said inner and ring gears, and means for axially moving said sleeves to engage selected sets of said clutch members.

17. In a device of the character described, a fixed housing, a rotor casing journaled in said housing, a ring gear casing journaled in said rotor casing, a differential casing journaled in said ring gear casing, an inner gear journaled in said rotor casing, an intermediate gear journaled on said differential casing, differential axles journaled in said differential casing, and selective clutches for correlating the said gears in varying combinations.

18. In a device of the character described, a fixed housing, a rotor casing journaled in said housing, a ring gear casing journaled in said rotor casing, a differential casing journaled in said ring gear casing, an inner gear journaled in said rotor casing, an intermediate gear journaled on said differential casing, differential axles journaled in said differential casing, means for driving said rotor casing, and clutch means for locking said rotor casing to said ring gear casing, said ring gear casing to said fixed housing, said rotor casing to said inner gear and said inner gear to said fixed housing.

19. In a differential gear system, shafts mounted on the differential casing, planetary pinions journaled on said shafts, a rotor, an inner gear journaled on the differential casing and the rotor, a ring for supporting the outer ends of the planetary gear shafts, and a bearing on said rotor in which said ring is journaled.

20. The combination with a differential gear system of a planetary gear system including a ring gear and an inner gear and having planetary pinions journaled on the differential casing, a rotor, a fixed element, selective clutches for correlating elements in any of the following combinations: low speed; locking said rotor to said inner gear and said ring gear to said fixed element; second speed; locking said inner gear to said fixed element and said rotor to said ring gear; high speed; locking said inner gear and said ring gear to said rotor; a pair of levers mediately connected to said clutches, and a manually operated control lever selectively engageable with said pair of levers to move said pair of levers together in either direction or one of said pair in one direction and the other one in the other direction.

21. The combination with a differential gear system of a planetary gear system including an inner gear and having planetary pinions journaled on the differential casing, a rotor, a fixed element, a sleeve fixed for rotation with said inner gear and axially movable relative thereto, clutch members on said sleeve, and complementary clutch members on said rotor and on said fixed element.

22. The combination with a differential gear system of a planetary gear system including an inner gear and having planetary pinions journaled on the differential casing, a rotor, a fixed element, a sleeve fixed for rotation with said inner gear and axially movable relative thereto, clutch members on said sleeve, complementary clutch members on said rotor and on said fixed element, means for driving the rotor and means for axially moving the sleeve to engage its clutch members optionally with either set of complementary clutch members.

23. The combination with a differential gear system and a rotor for driving the same of a planetary gear system having planetary pinions journaled on the differential casing and an inner gear journaled on said rotor and on said differential casing.

In testimony whereof, I have hereunto set my hand.

CHARLES E. STARR.